(12) United States Patent
Romanovskiy et al.

(10) Patent No.: US 9,165,009 B1
(45) Date of Patent: Oct. 20, 2015

(54) LIGHTWEIGHT APPLIANCE FOR CONTENT STORAGE

(71) Applicant: EMC Corporation, Hopkinton, MA (US)

(72) Inventors: Alexey Romanovskiy, St. Petersburg (RU); Tianqing Wang, Shanghai (CN); Andrey Pakhomov, Saint-Petersburg (RU); Vasily Zalunin, Saint-Petersburg (RU)

(73) Assignee: EMC CORPORATION, Hopkinton, MA (US)

( * ) Notice: Subject to any disclaimer, the term of this patent is extended or adjusted under 35 U.S.C. 154(b) by 182 days.

(21) Appl. No.: 13/804,893

(22) Filed: Mar. 14, 2013

(51) Int. Cl.
   *G06F 17/30* (2006.01)
(52) U.S. Cl.
   CPC .... *G06F 17/30153* (2013.01); *G06F 17/30017* (2013.01); *G06F 17/30244* (2013.01)
(58) Field of Classification Search
   CPC ............... G06F 17/30017; G06F 17/30244; G06F 17/30153
   USPC ........................................................ 707/693
   See application file for complete search history.

(56) References Cited

U.S. PATENT DOCUMENTS

| | | | |
|---|---|---|---|
| 6,055,543 A * | 4/2000 | Christensen et al. | 1/1 |
| 7,028,253 B1 | 4/2006 | Lieberman et al. | |
| 8,219,534 B2 * | 7/2012 | Rao et al. | 707/693 |
| 8,762,325 B2 * | 6/2014 | Xiong et al. | 707/609 |
| 2002/0003886 A1 * | 1/2002 | Hillegass et al. | 380/282 |
| 2002/0033762 A1 * | 3/2002 | Belu | 341/87 |
| 2002/0191692 A1 * | 12/2002 | Fallon et al. | 375/240 |
| 2006/0041661 A1 | 2/2006 | Erikson et al. | |
| 2006/0047926 A1 * | 3/2006 | Zheng | 711/162 |
| 2006/0056832 A1 | 3/2006 | Yamaguchi et al. | |
| 2006/0104526 A1 * | 5/2006 | Gringeler et al. | 382/239 |
| 2007/0086664 A1 * | 4/2007 | Kim et al. | 382/239 |
| 2007/0174366 A1 * | 7/2007 | Palapudi et al. | 707/205 |
| 2007/0266044 A1 * | 11/2007 | Grondin et al. | 707/102 |
| 2007/0266252 A1 * | 11/2007 | Davis et al. | 713/176 |
| 2009/0174798 A1 * | 7/2009 | Nilsson | 348/294 |
| 2009/0226084 A1 | 9/2009 | Courchesne et al. | |
| 2011/0066808 A1 * | 3/2011 | Flynn et al. | 711/118 |
| 2011/0113011 A1 * | 5/2011 | Prorock et al. | 707/634 |
| 2013/0024807 A1 | 1/2013 | Kobayashi et al. | |

* cited by examiner

*Primary Examiner* — Jensen Hu
(74) *Attorney, Agent, or Firm* — John Gould; Theodore A. Chen; Krishnendu Gupta

(57) ABSTRACT

A method, article of manufacture, and apparatus for lightweight storage of content is disclosed. In some embodiments, a request to store a photograph is received from a user. The content of the photograph is then compressed. A list of multi-image container files associated with the user and with sufficient storage space available to store the compressed content of the photograph is then retrieved. The compressed content of the photograph is stored in a multi-image container file. Finally, the modified multi-image file is stored in a storage device.

16 Claims, 6 Drawing Sheets

LIGHTWEIGHT APPLIANCE FOR CONTENT STORAGE

CROSS-REFERENCE TO RELATED APPLICATIONS

This application is related to co-pending U.S. patent application Ser. No. 13/804,962 and filed concurrently herewith, which is incorporated herein by reference for all purposes.

BACKGROUND OF THE INVENTION

Modern storage systems store many different types of objects (e.g. text files, XML files, image files, video files, etc.). With the proliferation of social networking and other technologies that increase the ease and capabilities with which users may share information, sharing information between geographically dispersed users has rapidly increased and the demand for efficient, lightweight storage of digital images in particular has rapidly increased.

To maintain near instantaneous access to photos and other objects, storage systems must constantly store higher volumes of information while constantly improving access rates to these higher volumes of information. Various methods have been proposed and implemented to store more information (e.g. deduplication) and improve access rates (e.g. use solid-state drives), but very few solutions have taken advantage of the unique storage and retrieval requirements for photographs.

There is a need, therefore, for an improved method, article of manufacture, and apparatus for content storage and retrieval that takes advantage of this unique characteristic of photo storage.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
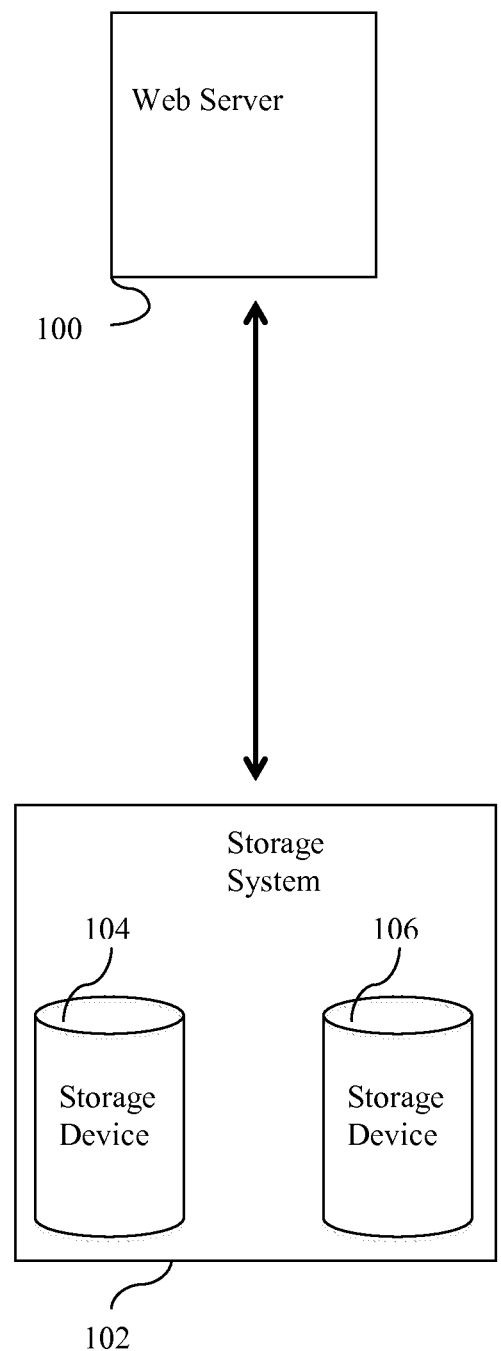
FIG. 1 is a diagram of a content storage system in accordance with some embodiments.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

An embodiment of the invention will be described with reference to a data storage system in the form of a storage system configured to store files, but it should be understood that the principles of the invention are not limited to this configuration. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

The present disclosure discusses methods and systems for lightweight content storage and retrieval. In an embodiment, a novel multi-image container file format may be leveraged to efficiently store and retrieve photographs. The multi-image container file may be generated by storing photograph content from multiple photographs belonging to a user or to a user's groups (collections of a user's photos, such as "Family," "Vacation," etc.). Photograph content is generally less likely to be modified than photograph metadata, so storing photograph content separately from photograph metadata allows for efficient storage and retrieval of photographs in a storage system. This may be particularly beneficial in the context of storage systems containing both hard-disk drives and solid-state drives, where limited storage space needs to be efficiently utilized based on how often modifications are made.

The present disclosure makes reference to photographs, as one illustrative category of digital content. These references are meant to apply to all forms of digital content, including, but not limited to, audio, video, medical images, electronic patient records, blood sampling data, musical lyrics, etc. Similarly, references made to social media sites are for illustrative purposes only, the present disclosure relates also to cloud-based medical storage and content delivery applications, electronic commerce applications, governmental sharing services, transactional interfaces for banks, etc.

Turning now to FIG. 1, a data system for storing information in accordance with some embodiments is shown for reference. The data system shown in FIG. 1 has Web Server 100 and Storage System 102. Web Server 100 initiates a plurality of requests to store information and sends these requests to Storage System 102. These requests may include requests to store photographs (these photographs may be stored in a variety of formats, such as .jpg, .png, .tiff, and many others), basic text files, XML files, and many other types of objects. After receiving a request from Web Server 100, Storage System 102 determines an appropriate storage location for all of the objects and stores each object at the determined location.

Data systems such as FIG. 1 may not take advantage of characteristics unique to the storage of photographs. Indeed, all types of objects are often stored in an identical fashion. The content of photographs, however, does not need to be modified as often as the content for other types of objects (e.g. a text file). Moreover, in the context of a data system with many users (e.g. a social networking website), because numerous different types of objects are stored together, one user's photographs might be stored on a variety of different disks within Storage System 102.

For example, user 1 may have fifty photos. If Storage Device 104 only has capacity to store fifteen of these photos (because most of the storage capacity has been filled with other types of objects), then the remaining thirty-five photos might be stored on a separate physical storage device, such as Storage Device 106. When Web Server 100 initiates a request to view all photos belonging to user 1, then Storage System 102 will need to access and read from Storage Device 104 and from Storage Device 106, in order to locate all of the photographs belonging to user 1. As such, locating and retrieving all requested photographs for a particular user can be time-consuming and inefficient. With the use of multi-image container files, the storage and retrieval of photographs is enhanced.

Figure 2:
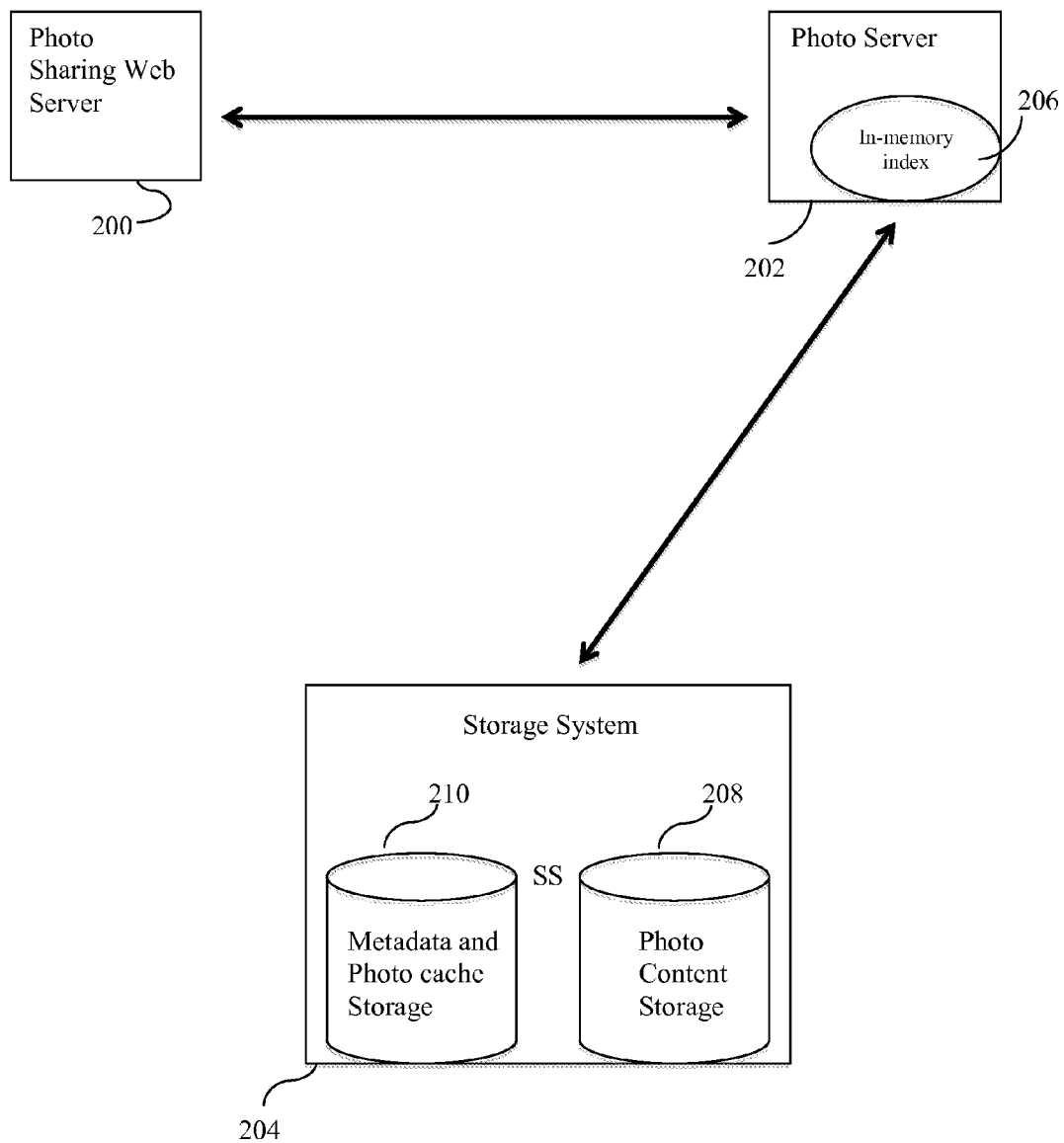
FIG. 2 is a diagram of a content storage system in accordance with some embodiments.

FIG. 2 illustrates a data system for storing and retrieving photographs in accordance with one embodiment of the present disclosure. Photo Sharing Web Server 200 sends requests to Photo Server 202. Photo Server 202 interprets these requests and forwards them to Storage System 204. Storage System 204 determines an appropriate storage and/or retrieval location for each photograph's content (e.g. Storage Device 208) and a separate storage and/or retrieval location for the associated metadata for each determined photograph content (e.g. Storage Device 210). In some embodiments, Storage Device 210 uses a hash data structure to maintain relationships between users, groups, and individual photos. Storage Device 210 may also use a cache algorithm, such as Least Recently Used (LRU), to efficiently utilize the storage space allocated to the photo cache.

Although FIG. 2 illustrates Photo Server 202 as external to Storage System 204, in some embodiments, Photo Server 202 may actually reside within Storage System 204 or within Photo Sharing Web Server 200. Similarly, although FIG. 2 illustrates Storage System 204 sending requests to and receiving requests from Photo Server 202, in some embodiments, some types of requests from Photo Sharing Web Server 200 may be sent directly to Storage System 204 and some types of requests may be sent directly from Storage System 204 to Photo Sharing Web Server 200. Moreover, Storage Device 210 is illustrated as one physical storage location, but in some embodiments, metadata could be stored at a separate physical storage location from that used to store the photo cache. Additionally, Photo Server 202, Storage System 204, and Photo Sharing Web Server 200, in some embodiments, may be implemented as single-box devices or as a group of devices working together (e.g. a cluster).

By creating a data system that treats photographs differently from other objects, a data system like the one illustrated in FIG. 2 can take advantage of characteristics that are unique to the storage of photographs and, thereby, eliminate inefficiencies.

For example, Storage System 204 allows for efficient utilization of a variety of storage device types. Although solid-state drives provide many advantages over hard-disk drives (e.g. no moving parts, lower read latency, faster random access time, etc.), they may still be more expensive and may not provide the same storage capacity available with less expensive hard-disk drives. Organizations may therefore own both types of storage devices. As shown in more detail in FIG. 2, Storage Device 210 stores photograph metadata and a photo cache, and Storage Device 208 stores the contents of photos. In some embodiments, Storage Device 210 contains a plurality of solid-state drives and Storage Device 208 contains a plurality of hard-disk drives with higher storage capacity. As previously discussed, the contents of photographs do not often require modification, so waiting for the time it takes to move mechanical parts to locate the desired photograph content rarely occurs. Storing photograph content in hard disk drives also allows using the higher performance solid-state drives to store oft-accessed and oft-modified photograph metadata.

Furthermore, an in-memory index, such as In-memory Index 206 can be used to improve retrieval and storage of photographs. In-memory Index 206 can be used to store information such as the physical volume information of multi-image container files containing the content of photographs for a particular user or a particular group. An in-memory index can also be used to store basic metadata information (e.g. photo title, comments associated with the photos, etc.). By storing this information in an in-memory index, the location of a single photograph or plurality of photographs can be determined very quickly and without having to search through storage drives within the storage system itself to find the desired photograph or photographs. Therefore, the storage and retrieval times for photographs can be greatly enhanced.

Figure 3:
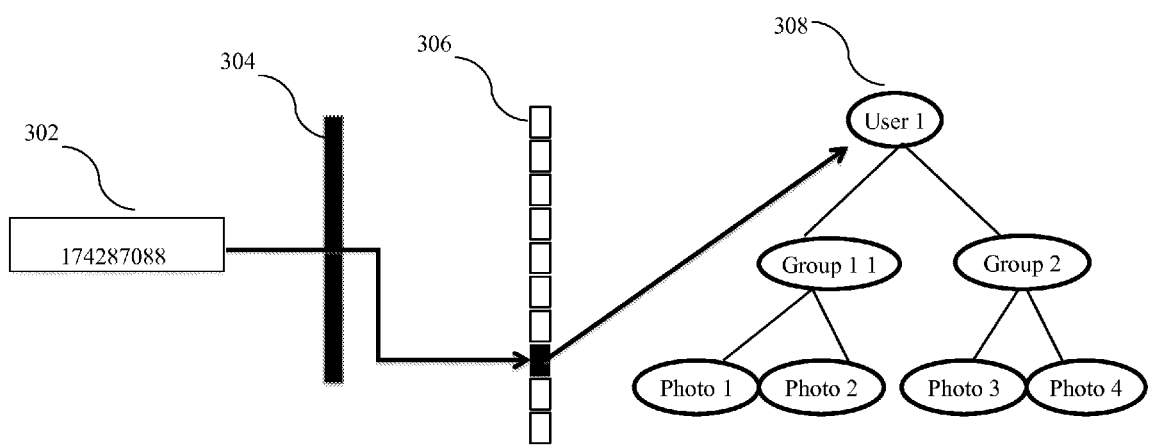
FIG. 3 is a diagram of an in-memory index in accordance with some embodiments.

For example, a diagram of In-memory Index 206 is shown in FIG. 3. Photo Server 202 may provide a file interface to external services, such as Photo Sharing Web Server 200. In an embodiment, this file interface allows the external services to request a specific photograph by providing a key, such as Key 302. Key 302 represents an encoded value (e.g. directory path to a specific photo encoded using a hash function such as the MD5 message-digest algorithm). In-memory Index 206 then applies Hash Function 304 to determine a lookup location within Hash Table 306. In-memory Index 206 then retrieves Data Structure 308 from within Hash Table 306.

As shown in FIG. 3, Data Structure 308 may utilize a tree-like structure to store the hierarchical relationship between users, groups, and individual photos. In some embodiments, metadata is attached to each node in Data Structure 308. This metadata may include physical volume information of multi-image container files associated with the user, offset values indicating the location of specific photograph content within the multi-image container file, and other information about photograph content and multi-image container files associated with a user (e.g. storage size, cached flag, etc.). Photo Server 202 utilizes this metadata to quickly retrieve photographs from Storage System 204 and/or to quickly determine appropriate storage locations for photograph content.

Figure 4:
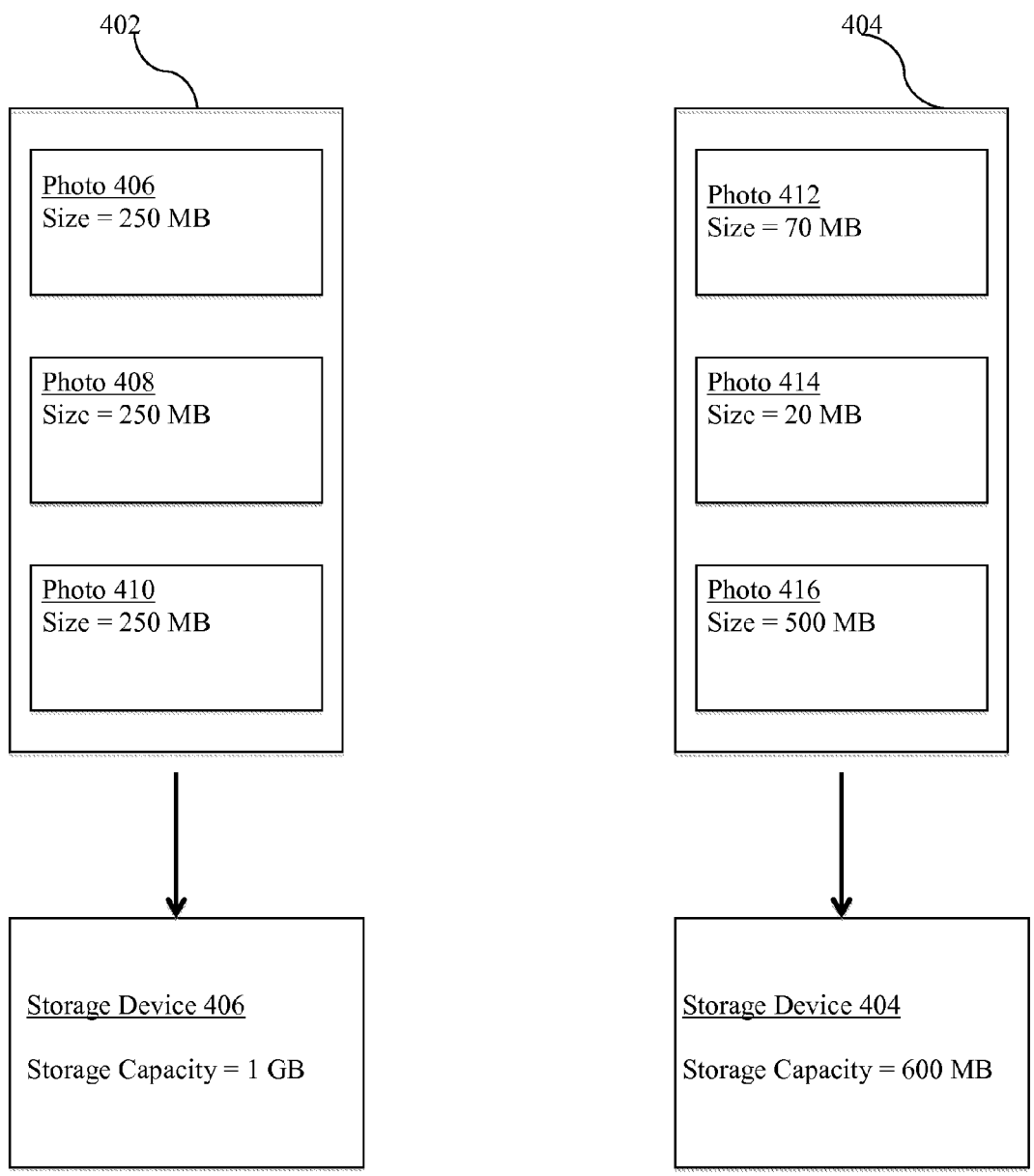
FIG. 4 is a diagram of multi-image container files in accordance with some embodiments.

Turning now to FIG. 4, a diagram of multi-image container files in accordance with some embodiments is shown. Data systems like that illustrated in FIG. 2 may utilize multi-image container files to store the content from multiple photographs in one continuous file. Multi-image container files help to eliminate storage of a single user's photographs on different physical disks and to help ensure that photos that are typically viewed together are also stored together.

In many embodiments, a photo storage system determines storage locations based solely on the available storage space in storage devices. For example, if requests are received to store Photo 406, Photo 408, Photo 410, and Photo 412, then all four of these photos could be stored on a single storage device, such as Storage Device 406 (the photos occupy a total of 820 megabytes (MB) of storage space and Storage Device 406 has a storage capacity of 1 gigabyte (GB)). If a later request is received to store Photo 414, then because Storage Device 406 has less than 200 MBs of available storage space, a different physical storage device, such as Storage Device 404 will be used to store Photo 414. If, in this scenario, Photo 412 and Photo 414 are associated with a single user, then when that user requests access to all of their photos, both Storage Device 406 and Storage Device 404 must be accessed and searched, in order to locate all photos associated with the user. This is inefficient and will often result in frustrated users having to wait for their photographs.

As illustrated in FIG. 4, instead of storing one user's photos on multiple disks, the use of multi-image container files helps to ensure that one user's photos are stored together. For example, consider the scenario in which Photo 406, Photo 408, and Photo 410 all belong to a first user and Photo 412, Photo 414, and Photo 416 all belong to a second user. Before determining whether to store each photo within either Storage Device 406 or Storage Device 404, multi-image container files can be used to organize and store the photos belonging to each user. For example, Multi-Image Container File 402 can be used to store all photos belonging to the first user (Photo 406, Photo 408, and Photo 410) and Multi-Image Container File 404 can be used to store all photos belonging to the second user (Photo 412, Photo 414, and Photo 416). After storing the photos within multi-image container files, a determination can be made about an appropriate physical storage location for the multi-image container files. In the present example, Multi-Image Container File 402 requires 750 MBs of storage space, so only Storage Device 406 has enough available storage capacity (1 GB>750 MB) to store Multi-Image Container File 402. Because Multi-Image Container File 404 requires 590 MB of storage space, Storage Device 404 has sufficient storage capacity (600 MB>590 MB). In this way, multi-image container files can be effectively utilized to ensure that a user's photos are stored on a single physical storage device, ensuring that the user's photos can be retrieved from a single physical storage device.

Multi-image container files may also be configured to accommodate fixed-size or variable-size storage capacities. Analysis of user behavior may help to reveal the appropriate size for the multi-image container files. For example, if users of a particular system store an average of 100 photos each, with each uncompressed photo requiring 2 MB of storage space for the content of the photo, then fixed size multi-image container files of 100 megabytes each may be deemed appropriate. The analysis of user behavior might be conducted per user or conducted per system (and might be conducted automatically or require manual intervention to begin the analysis of user behavior), so that an appropriate fixed-size for multi-image container files could be applied system-wide or on a per user basis.

Multi-image container files could also be configured to store the content for a single user's photos or multiple users' photo, depending on how many photos each user has and the storage capacity required for each of the photos. For example, if user 1 and user 2 have only 1 photo each and the two photos can be stored within a single multi-image container file, then these photos could be stored together, and because each multi-image container file is stored on a single storage device, accessing only a single storage device could retrieve each user's photos.

Moreover, multi-image container files may be configured to store photos assigned to one of a plurality of a user's groups. For example, if a user has 3,000 photos and these photos have been grouped into a "Family" group, a "Vacation" group, and a "Miscellaneous" group, then storing the photos for each group in a different multi-image container file may be appropriate. This setting could be configured on a per-user basis, so that some user's photos are stored in user-specific multi-image container files (likely those users with smaller quantities of photos) and other user's photos are stored in group-specific multi-image container files (likely those users with larger quantities of photos). If a user's photos are configured to be stored in group-specific multi-image container files and a user attempts to store a photo that does not belong to a group, then a default group can be selected in order to avoid any potential errors or performance issues.

Figure 5:
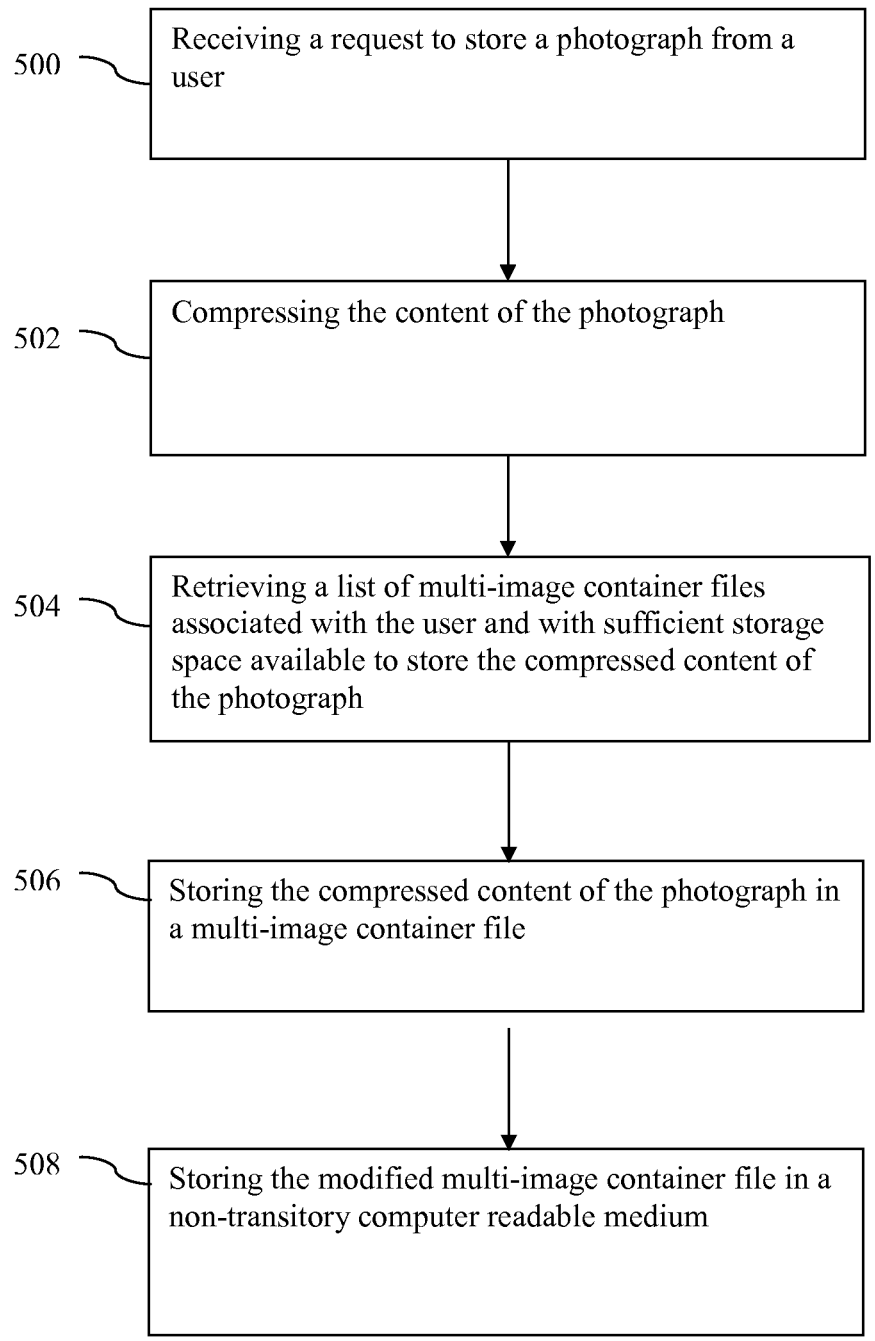
FIG. 5 is a flowchart of a lightweight appliance for content retrieval in accordance with some embodiments.

FIG. 5 is a flowchart of a lightweight appliance for photo storage in accordance with some embodiments, comprising receiving a request to store a photograph from a user in step 500, compressing the content of the photograph in step 502, retrieving a list of multi-image container files associated with the user and with sufficient storage space to store the compressed content of the photograph in step 504, storing the compressed content of the photograph in a multi-image container file in step 506, storing the modified multi-image container file in a storage device in step 508. In some embodiments, associated metadata for each photograph is retrieved by, for example, extracting all information from the Exchangeable Image File Format (EXIF) data within the photograph.

In some embodiments, compressing the content of the photograph may involve the use of a re-compression algorithm. Re-compression allows for storage of an image in a more compact form and using less space within a data storage system. The re-compression step is transparent to the end user and may occur with (lossy re-compression) or without (lossless re-compression) data loss.

In some embodiments, the user may request to store or retrieve photographs associated with a particular group. As discussed above, to accommodate these requests, the multi-image container files could be configured to store only a user's photos that belong to a particular group. In some embodiments, this could be configured using a configuration file or this could be configured through the use of a graphical display that allows a user and/or a system administrator to configure settings for multi-image container files.

Furthermore, a user's groups may be utilized to enhance an in-memory index, such as In-memory Index 206. If a user has numerous files, then retrieving physical volume information for all multi-image container files for a particular user may require searching numerous physical volume locations and numerous multi-image container files, in order to find contents for a desired photograph. In-memory Index 206 can be updated to store physical volume information for multi-image container files for each of a user's groups, instead of storing the locations for all multi-image container files associated with a user. Retrieving only the physical volume information for multi-image container files for a user's requested group will reduce the number of multi-image container files that must be searched in order to locate the content for a desired photograph. Additionally, retrieving only the physical volume information for multi-image container files for a user's requested group also reduces the number of multi-image container files that must be searched in order to find room to store the contents of a newly uploaded photo.

Figure 6:
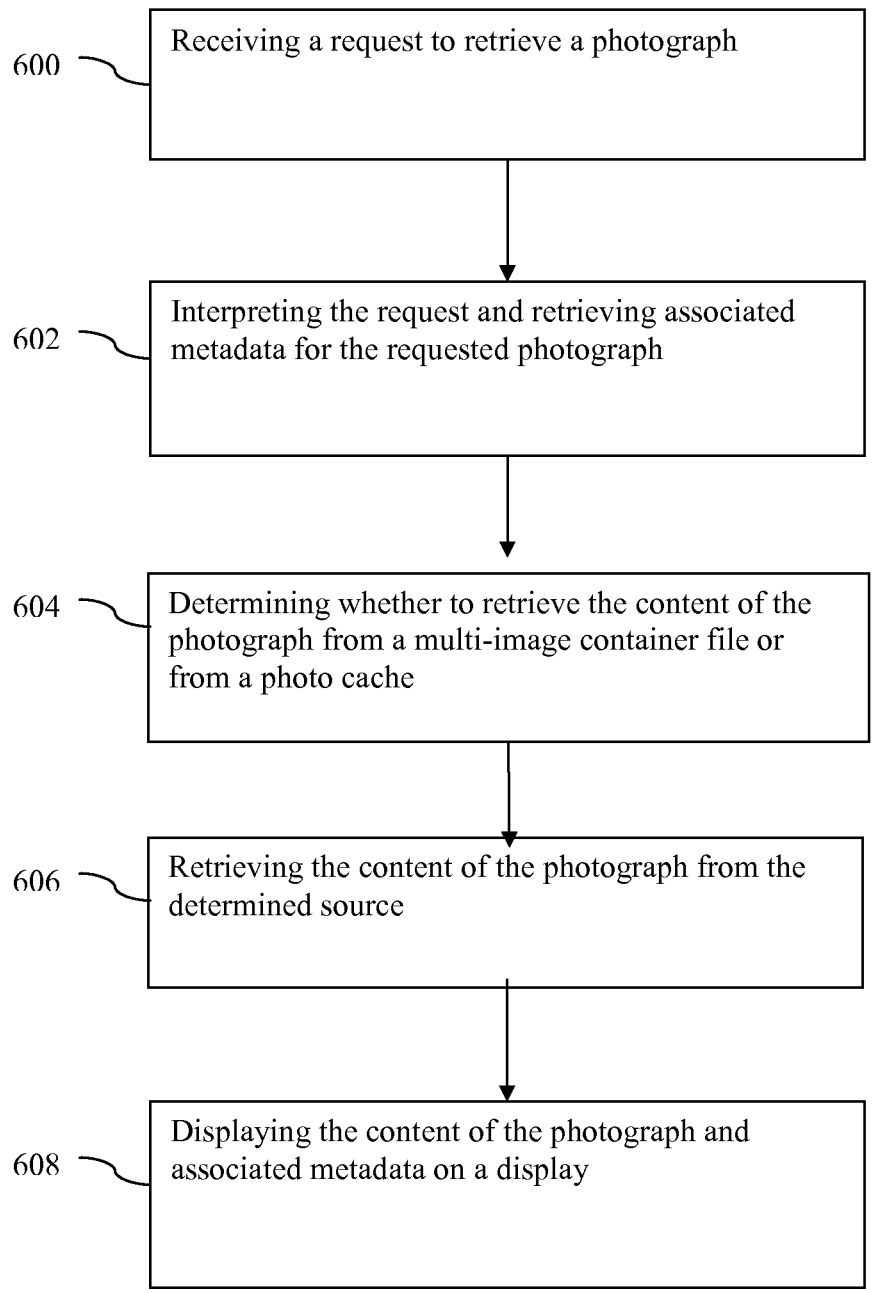
FIG. 6 is a flowchart of a lightweight appliance for content storage in accordance with some embodiments.

FIG. 6 is a flowchart of a lightweight appliance for photo retrieval in accordance with some embodiments, comprising receiving a request to retrieve a photograph in step 600, interpreting the request and retrieving associated metadata for the requested photograph in step 602, determining whether to retrieve the content of the photograph from a multi-image container file or from a photo cache in step 604, retrieving the content of the photograph from the determined source in step 606, and displaying the content of the photograph and associated metadata on a display in step 608.

In some embodiments, requests made to retrieve photographs may be received by Photo Sharing Web Server 200 in the form of a request for a photo with a specific universal resource identifier (URI). The URI is then used to determine a group (i.e. collection of photographs) for the requested photo (if the requested photo is associated with a group then that group is selected, otherwise a default group is selected if the requested photo is not currently associated with a particular group) and the name of the photo. This information may then be used by an in-memory index to retrieve the physical location of the multi-image container files associated with the user and/or the requested group, and this location information can then be utilized to quickly locate the content and metadata associated with the requested photo. Moreover, in some embodiments, the use of photo caching is configurable. A system administrator or user can access a configuration file or a graphical user interface that allows for selecting whether or not to enable the use of photo caching.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer.

Various functions described above may be performed by a single process or groups of processes, on a single computer or distributed over several computers. Processes may invoke other processes to handle certain tasks. A single storage device may be used, or several may be used to take the place of a single storage device. The disclosed embodiments are illustrative and not restrictive, and the invention is not to be limited to the details given herein. There are many alternative ways of implementing the invention. It is therefore intended that the disclosure and following claims be interpreted as covering all such alterations and modifications as fall within the true spirit and scope of the invention.

What is claimed is:

1. A method for lightweight storage of content, comprising:
   receiving a request from a user to store a photograph in a group associated with the user, wherein the group is associated in an in-memory index with a plurality of multi-image container files, wherein the photograph includes content;
   extracting metadata from the photograph;
   compressing the content of the photograph;
   retrieving a list of the multi-image container files associated with the group and with storage space available to store the compressed content of the photograph;
   storing the compressed content of the photograph in a multi-image container file;
   storing the multi-image container file in a non-transitory computer readable medium; and
   storing all extracted metadata in a solid-state storage device, wherein the extracted metadata is stored on a separate device from the photograph.

2. The method as recited in claim 1, wherein retrieving the list of multi-image container files associated with the user includes using the in-memory index.

3. The method as recited in claim 2, wherein the retrieved list includes physical volume information of the multi-image container files.

4. The method as recited in claim 1, further comprising disabling the compression of the content of the photograph.

5. The method as recited in claim 1, wherein extracting metadata from the photograph includes extracting all information from EXIF data within the photograph.

6. The method as recited in claim 1, further comprising re-compressing the content of the photograph.

7. A system for lightweight storage of content, comprising a non-transitory computer readable medium and a hardware processor configured to
   receive a request from a user to store a photograph in a group associated with the user, wherein the group is associated in an in-memory index with a plurality of multi-image container files, wherein the photograph includes content;
   extract metadata from the photograph;
   compress the content of the photograph;
   retrieve a list of the multi-image container files associated with the group and with storage space available to store the compressed content of the photograph;
   store the compressed content of the photograph in a multi-image container file;
   store the multi-image container file in a non-transitory computer readable medium; and
   store all extracted metadata in a solid-state storage device, wherein the extracted metadata is stored on a separate device from the photograph.

8. The system as recited in claim 7, wherein retrieving the list of multi-image container files associated with the user includes using the in-memory index to retrieve the list.

9. The system as recited in claim 8, wherein the retrieved list includes physical volume information of the multi-image container files.

10. The system as recited in claim 7, further comprising re-compressing the content of the photograph.

11. The system as recited in claim 7, wherein extracting metadata from the photograph includes extracting all information from EXIF data within the photograph.

12. A computer program product for lightweight storage of content, comprising a non-transitory computer readable medium having program instructions embodied therein for:
   receiving a request from a user to store a photograph in a group associated with the user, wherein the group is associated in an in-memory index with a plurality of multi-image container files, wherein the photograph includes content;

extracting metadata from the photograph;

compressing the content of the photograph;

retrieving a list of the multi-image container files associated with the group and with storage space available to store the compressed content of the photograph;

storing the compressed content of the photograph in a multi-image container file;

storing the multi-image container file in a non-transitory computer readable medium; and storing all extracted metadata in a solid-state storage device, wherein the extracted metadata is stored on a separate device from the photograph.

13. The computer program product as recited in claim 12, wherein retrieving the list of multi-image container files associated with the user includes using the in-memory index to retrieve the list.

14. The computer program product as recited in claim 13, wherein the retrieved list includes physical volume information of the multi-image container files.

15. The computer program product as recited in claim 12, further comprising re-compressing the content of the photograph.

16. The computer program product as recited in claim 12, wherein extracting metadata from the photograph includes extracting all information from EXIF data within the photograph.

* * * * *